(12) United States Patent      (10) Patent No.:   US 12,657,332 B2

Natili et al.      (45) Date of Patent:    Jun. 16, 2026

(54) SYSTEMS AND METHODS FOR FACILITATING ON-DEMAND ARTIFICIAL INTELLIGENCE MODELS FOR SANITIZING SENSITIVE DATA

(71) Applicant: Capital One Services, LLC, McLean, VA (US)

(72) Inventors: Giorgio Natili, Fox Island, WA (US); Sudheendra Kumar Kaanugovi, Aldie, VA (US)

(73) Assignee: Capital One Services, LLC, McLean, VA (US)

( * ) Notice: Subject to any disclaimer, the term of this patent is extended or adjusted under 35 U.S.C. 154(b) by 755 days.

(21) Appl. No.: 17/937,113

(22) Filed: Sep. 30, 2022

(65) Prior Publication Data

US 2024/0111892 A1     Apr. 4, 2024

(51) Int. Cl.
*G06F 21/00*      (2013.01)
*G06F 21/62*      (2013.01)

(52) U.S. Cl.
CPC ............................... *G06F 21/6245* (2013.01)

(58) Field of Classification Search
None
See application file for complete search history.

(56) References Cited

U.S. PATENT DOCUMENTS

| | | | | |
|---|---|---|---|---|
| 2015/0379425 | A1* | 12/2015 | Dirac ...................... | G06N 20/00 706/12 |
| 2016/0078361 | A1* | 3/2016 | Brueckner .............. | H04L 67/10 706/12 |
| 2016/0371331 | A1* | 12/2016 | Pagh .................. | G06F 16/24554 |
| 2018/0314761 | A1* | 11/2018 | Lewin-Eytan ...... | G06F 16/9535 |
| 2019/0190890 | A1* | 6/2019 | Druker ................ | G06F 21/6254 |
| 2020/0089650 | A1* | 3/2020 | Sharma ................... | G06F 18/15 |
| 2021/0006650 | A1* | 1/2021 | Yankov ................. | H04W 4/029 |
| 2021/0019312 | A1* | 1/2021 | Shaik ................ | G06F 16/24522 |
| 2021/0092026 | A1* | 3/2021 | Di Pietro ............. | G06N 3/0985 |
| 2021/0157845 | A1* | 5/2021 | Dodel ............... | G06F 16/24578 |
| 2021/0319179 | A1* | 10/2021 | Muffat ................ | G06F 21/6245 |
| 2022/0036123 | A1* | 2/2022 | Cummings ........... | G06F 18/285 |
| 2022/0060501 | A1* | 2/2022 | Liu ........................ | G06F 21/554 |
| 2022/0237506 | A1* | 7/2022 | Feldman ............. | G06F 9/45558 |
| 2022/0318387 | A1* | 10/2022 | Chen ...................... | G06N 20/00 |
| 2022/0318420 | A1* | 10/2022 | Marino ................... | G06F 21/53 |
| 2022/0335153 | A1* | 10/2022 | Herman ................. | G06N 3/045 |
| 2022/0343205 | A1* | 10/2022 | Yu .......................... | G06N 3/091 |
| 2022/0358237 | A1* | 11/2022 | Banipal ................. | G06N 20/00 |
| 2023/0011451 | A1* | 1/2023 | Lu ........................... | H04L 51/02 |
| 2023/0059367 | A1* | 2/2023 | Lai ...................... | G06F 21/6245 |
| 2023/0319098 | A1* | 10/2023 | Berlin ................... | G06N 5/022 726/24 |
| 2023/0393960 | A1* | 12/2023 | Yadagiri ............. | G06F 11/3452 |
| 2025/0225478 | A1* | 7/2025 | Bhanot ..................... | G06F 8/38 |

* cited by examiner

*Primary Examiner* — Eleni A Shiferaw
*Assistant Examiner* — Hassan A Hussein
(74) *Attorney, Agent, or Firm* — Foley & Lardner LLP

(57)            ABSTRACT

Methods and systems are described herein for leveraging artificial intelligence to sanitize sensitive data and prevent the data from leaving the mobile device and/or be exposed to unauthorized third parties. More specifically, methods and systems are described for a novel and unconventional architecture for a data sanitization application, a novel and unconventional delivery format for the data sanitization model, and a novel and unconventional output format of the data sanitization model.

21 Claims, 10 Drawing Sheets

<u>200</u>

220

| ML-Driven Data Classifier | | | |
|---|---|---|---|
| Entity | Precision | Recall | F1-Score |
| Address | 1.00 | 0.99 | 1.00 |
| Ban | 0.93 | 0.69 | 0.79 |
| Credit Card | 1.00 | 1.00 | 1.00 |
| Drivers License | 0.69 | 0.73 | 0.71 |

230

| ReGex | | | |
|---|---|---|---|
| Entity | Precision | Recall | F1-Score |
| Address | 0.68 | 0.76 | 0.72 |
| Ban | 0.17 | 1.00 | 0.30 |
| Credit Card | 1.00 | 0.87 | 0.93 |
| Drivers License | 0.03 | 0.58 | 0.05 |

| Application Metrics | | |
|---|---|---|
| OS | iOS | Android |
| App Size Increase | +643 KB (~0.3%) | +270 KB (~0.5%) |
| App Load Time Increase | +30ms (~1%) | +35ms (~1%) |
| App Memory Footprint Increase | ~21 MB (~10%) | ~9.5 MB (~4%) |
| Device Coverage | 100% | >99.99% |

| Input | Output from ML Model | Output from regex |
|---|---|---|
| The application with id 1000058333392049 has been declined. | The application with id REDACTED-3:1.0000,1.0000,1.0000 has been declined. | The application with id REDACTED-101REDACTED-1016. |
| My credit card number 14216273514216211 is my savor card | My credit card number REDACTED-5:1.0000,1.0000,1.0000 is my savor card | My credit card number REDACTED-101I1REDACTED-1016 |
| My driver's license number is G47282397 and I am in VA | My driver's license number is REDACTED-9:0.9997,0.9999,1.0000 and I am in REDACTED-22:0.9779,0.9779,0.9779 | My driver's license number is G47282397 and I am in VA |

Detect a first data instance in a first dataset

602

Generate a first feature input based on the first data instance

604

Input the first feature input into a machine learning model

606

Receive a first output from the machine learning model

608

Select a first sanitization operation

610

Generate a first sanitized data instance

612

Transmit the first sanitized data instance

614

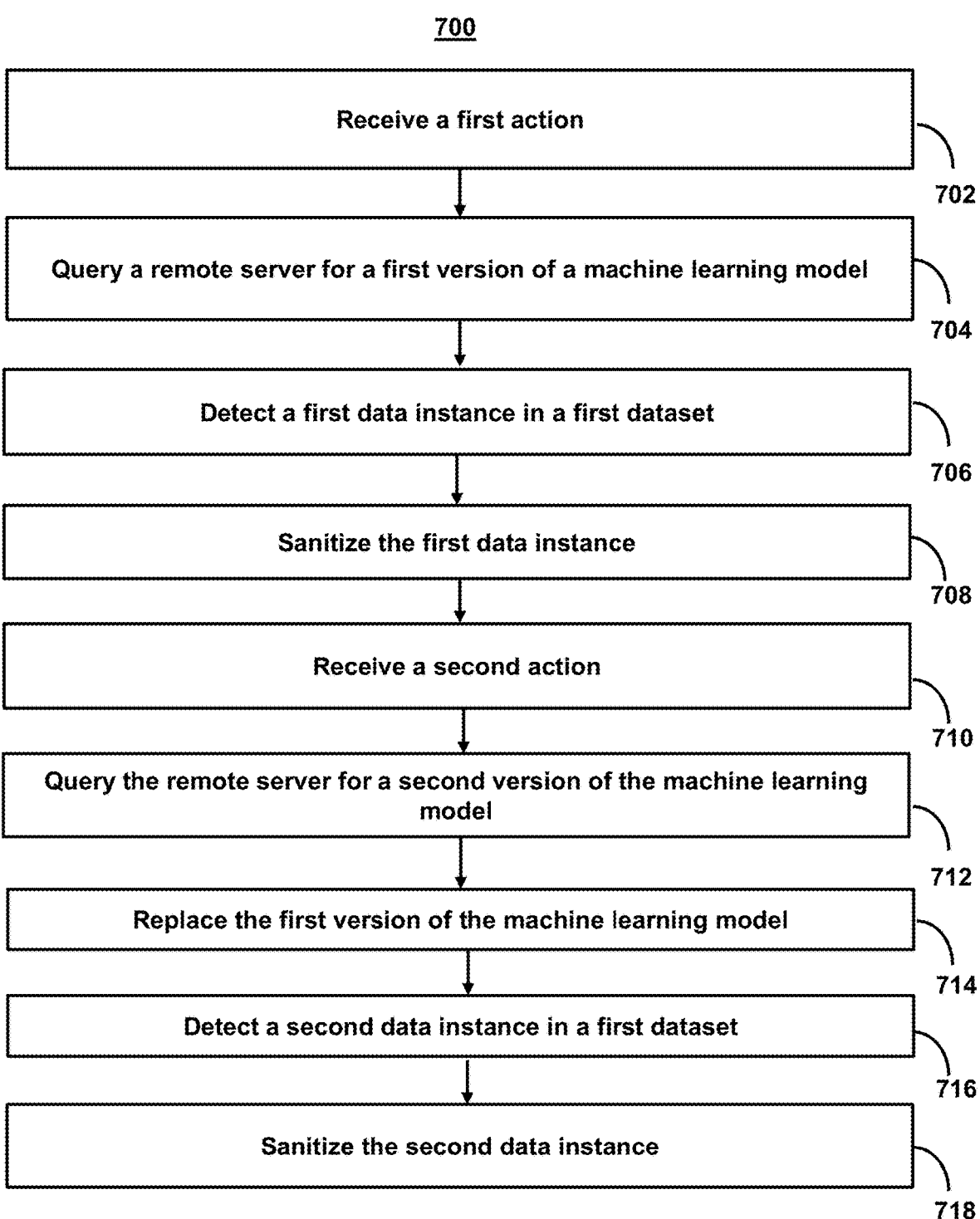

700

| Receive a first action |
| 702 |

| Query a remote server for a first version of a machine learning model |
| 704 |

| Detect a first data instance in a first dataset |
| 706 |

| Sanitize the first data instance |
| 708 |

| Receive a second action |
| 710 |

| Query the remote server for a second version of the machine learning model |
| 712 |

| Replace the first version of the machine learning model |
| 714 |

| Detect a second data instance in a first dataset |
| 716 |

| Sanitize the second data instance |
| 718 |

| Detect a first data instance in a first dataset |
| --- |
802

| Generate a first feature input based on the first data instance |
| --- |
804

| Input the first feature input into a machine learning model |
| --- |
806

| Receive a first output from the machine learning model |
| --- |
808

| Sanitize the first data instance |
| --- |
810

| Transmit the first sanitized data instance and the first output |
| --- |
812

FIG. 8

SYSTEMS AND METHODS FOR FACILITATING ON-DEMAND ARTIFICIAL INTELLIGENCE MODELS FOR SANITIZING SENSITIVE DATA

BACKGROUND

Data leakage and/or data loss is the unauthorized or erroneous transmission of data to an external destination or recipient. While data leakage may refer to data that is transferred electronically or physically, the primary vector of data leakage and/or data loss can be electronic due to the exponential increase in the electronic storage and transmission of data. One technique for mitigating data leakage is through data sanitization. For example, data sanitization may involve purposely modifying, deleting and/or destroying data from a communication and/or storage device to prevent recovery. Data sanitization may be effective in preventing/mitigating sensitive data leakage and/or data loss irrespective of whether the loss is based on data theft or negligent exposure.

SUMMARY

Methods and systems are described herein for novel uses and/or improvements for sanitizing sensitive data, particularly on mobile devices. As one example, methods and systems are described herein for sanitizing sensitive data and preventing the data from being exposed to unauthorized third parties. Existing systems may perform data sanitization by identifying sensitive data and performing one or more operations to sanitize and/or mask the sensitive data. An initial technical problem with data sanitization is determining what data is sensitive. For example, sensitive data may comprise confidential information (e.g., for a user or organization). Sensitive data may also include personally identifiable information (PII) or non-public personal information. These types of sensitive data may comprise information that identifies, relates to, describes, is capable of being associated with, or could reasonably be linked, directly or indirectly, with a particular user, a group of users, and/or a transaction (e.g., name, address, phone number, social security number, email, etc.). As such, a key technical challenge to overcome when performing data sanitization is identifying sensitive data.

In existing sanitization systems, identifying sensitive data may be based on the use of one or more regular expression (e.g., "regex") routines. Regex routines may comprise a string of text that a system may use to match, locate, and/or sanitize text. For example, the sanitization system may comprise a corpus of regex routines against which text in communications and electronically stored data is compared against. As the size of the corpus may become exorbitantly large, conventional sanitization systems rely on transmitting data to a remote server, which runs the regex routines and transmits instructions for sanitization back to the mobile device. While these transmissions are encrypted, the existence of the transmissions nonetheless may create a potential security risk.

Accordingly, disclosed embodiments may include methods and systems for sanitizing sensitive data and preventing the data from leaving the mobile device and/or be exposed to unauthorized third parties. One solution for achieving this may include the mobile device downloading the regex routines and running these routines locally. However, as previously mentioned, the size of the corpus of regex routines may create a technical barrier for devices (such as mobile devices) with limited storage space. Furthermore, while a single regex routine may easily be implemented, multiple routines (e.g., keyed to different types of sensitive data) may be required for even the simplest of datasets to capture any known sensitive data. Similarly, for more abstract (or unknown) instances of sensitive data or instances in which sensitive data is delineated between different datasets, there may be no regex routine available.

As such, methods and systems are described herein for leveraging artificial intelligence to sanitize sensitive data and prevent the data from leaving the mobile device and/or being exposed to unauthorized third parties. More specifically, methods and systems may include leveraging artificial intelligence models that may be downloaded and run locally on a mobile device. For example, a machine learning model, downloaded and run locally, may include the benefits of locally run regex routines, but also may overcome the technical limitations of the regex routines. The machine learning model may learn abstract (or unknown) instances, may detect sensitive data of different types simultaneously, and may generate confidences in delineated and/or overlapping data.

However, leveraging artificial intelligence models that may be downloaded and run locally on a mobile device also raises additional technical challenges and concerns. For example, while artificial intelligence models may benefit from being adaptable and thus detect abstract or unknown instances of sensitive data, the fact that the models are downloaded and run locally may decrease the level of governance a party has over the data. That is, the provider of the model may not have full insight into how the model is sanitizing the data, what data is being sanitized, and/or with what accuracy. As such, the methods and systems further describe how to overcome these novel technical challenges through the use of solutions such as a novel and unconventional architecture for a data sanitization application, a novel and unconventional delivery format for the data sanitization model, and a novel and unconventional output format of the data sanitization model.

A first solution to overcome these technical deficiencies in adapting artificial intelligence models for this practical benefit is the use of a novel and unconventional architecture for a data sanitization application. In particular, this architecture includes a bifurcated sanitization process involving (1) a machine learning model implemented in a data sanitization application residing on a mobile device; and (2) a data scrubbing application residing on a remote server. This bifurcated sanitization process mitigates the lack of insight into the model by allowing the sanitization process to perform an initial sanitization of data with a follow-up scrubbing to detect any additional sensitive data and/or incorrect sanitization. For example, as opposed to sanitizing data, the data scrubbing application may fix incorrect, incomplete, duplicate, mislabeled, and/or otherwise erroneous data in a dataset. To further ensure the sensitivity of the data, the model may determine whether to sanitize detected sensitive data (e.g., if it meets a first threshold) or simply mask the data (e.g., if it meets a second threshold) before sending the data to the data scrubbing application residing on a remote server. By doing so, the model may defer, or rely on, instances involving difficult to detect sensitive data to a more rigorous scrubbing process, and one subject to oversight, on the remote server. For example, a user may wish to transmit sensitive data (e.g., a phone number in a feedback form in order to receive a callback). A regex routine (or a model not trained to account for such an instance) may redact this data, which would prevent it from being recovered (and the user not receiving a callback). Using the bifurcated sanitization process, the model may mask this data (thus ensuring security) and transmit the data to the remote server for further review.

In some aspects, systems and methods are described for sanitizing sensitive data and prevent data leakage from mobile devices using a bifurcated sanitization process. For example, the system may detect, using a data sanitization application that is locally implemented on a mobile device, a first data instance in a first dataset, wherein the first dataset is stored on the mobile device. The system may generate, using the data sanitization application, a first feature input based on the first data instance. The system may input the first feature input into a machine learning model, wherein the machine learning model is trained to classify data instances in locally-stored datasets in order to sanitize the locally-stored datasets. The system may receive a first output from the machine learning model, wherein the first output comprises a first classification of the first data instance. The system may select a first sanitization operation from a plurality of sanitization operations for performing on the first data instance based on the first classification. The system may generate a first sanitized data instance based on the first sanitization operation. The system may transmit the first sanitized data instance to a remote server, wherein the remote server comprises a data scrubbing application.

A second solution to overcome these technical deficiencies in adapting artificial intelligence models for this practical benefit is the use of a novel and unconventional delivery format for the data sanitization model. For example, as mentioned above, because the machine learning model is downloaded and locally run on the mobile device, the provider of the model does not have full insight into how the model is sanitizing the data, what data is being sanitized, and/or with what accuracy. That is, the provider loses control over the model. This lack of control creates novel problems for the model. If the model remains static, the model loses its ability to adapt to new instances of sensitive data and/or train itself to classify abstract instances of sensitive data. However, if the machine learning model is allowed to train and/or update itself based on the local data, the lack of insight, etc. into the model is further exacerbated and the potential for introducing bias into the model is heightened. To maintain the benefits of the use of the artificial intelligence model, while mitigating the lack of control, the system uses an artificial intelligence model that is pulled down on demand. By using the on-demand artificial intelligence model, the provider may maintain control of the model (e.g., prior to download). Furthermore, as a new model is pulled down on demand, the model does not need to train and/or update itself in order to learn to classify new instances of sensitive data. Instead, the model may be continuously trained and/or updated, and the most recently updated model at the time of the launch of the mobile device may be sent.

In some aspects, systems and methods are described for sanitizing sensitive data and preventing data leakage from mobile devices using on demand artificial intelligence models. For example, the system may receive, at a mobile device, a first action. The system may, in response to the first action, query a remote server for a first version of a machine learning model, wherein the machine learning model is trained to classify data instances in locally-stored datasets in order to sanitize the locally-stored datasets. The system may detect, using a data sanitization application that is locally implemented on the mobile device, a first data instance in a first dataset, wherein the first dataset is stored on the mobile device. The system may sanitize the first data instance using the first version of a machine learning model. The system may receive, at the mobile device, a second action. The system may, in response to the second action, query the remote server for a second version of a machine learning model. The system may replace the first version of the machine learning model with the second version of a machine learning model. The system may detect, using the data sanitization application, a second data instance in the first dataset. The system may sanitize the second data instance using the second version of a machine learning model.

A third solution to overcome these technical deficiencies in adapting artificial intelligence models for this practical benefit is the use of an unconventional output format of the data sanitization model. For example, conventional data sanitization systems (e.g., those employing a regex routine) simply sanitize data instances. However, as the data sanitization application is relying on a model that is locally implemented, and for which it does not have full insight into what is happening, the output needs to include additional information. This additional information may then be used to determine the accuracy of the model (e.g., by a remote server and/or provider of the model) and determine whether future on-demand versions of the model need to be updated. In particular, the data sanitization application may transmit the sanitized data instance, but also an output of the model that comprises (1) a classification of the confidentiality type of the inputted data instance, and (2) a plurality of different confidence metrics for the classification. For example, based on this information, the system may determine how accurate the outputs are and what types of information are being sanitized correctly.

In some aspects, systems and methods are described for facilitating on demand artificial intelligence models to sanitize sensitive data and prevent data leakage from mobile devices. For example, the system may detect, using a data sanitization application that is locally implemented on a mobile device, a first data instance in a first dataset, wherein the first dataset is stored on the mobile device. The system may generate, using the data sanitization application, a first feature input based on the first data instance. The system may input the first feature input into a machine learning model, wherein the machine learning model is trained to classify data instances in locally-stored datasets in order to sanitize the locally-stored datasets. The system may receive a first output from the machine learning model, wherein the first output comprises a first classification of the first data instance and a first confidence metric for the first classification. The system may sanitize the first data instance using the machine learning model to generate a first sanitized data instance. The system may transmit the first sanitized data instance, the first classification, and the first confidence metric to a remote server, wherein the remote server uses the first classification and the first confidence metric to measure an accuracy of the machine learning model.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 2A-C show illustrative diagrams of the benefits of the data sanitization application, in accordance with one or more embodiments.

FIG. 5 shows an illustrative diagram for an output of an artificial intelligence model for a data sanitization application, in accordance with one or more embodiments.

FIG. 7 shows a flowchart of the steps involved in sanitizing sensitive data and preventing data leakage from mobile devices using on demand artificial intelligence models, in accordance with one or more embodiments.

FIG. 8 shows a flowchart of the steps involved in facilitating on demand artificial intelligence models to sanitize sensitive data and prevent data leakage from mobile devices, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
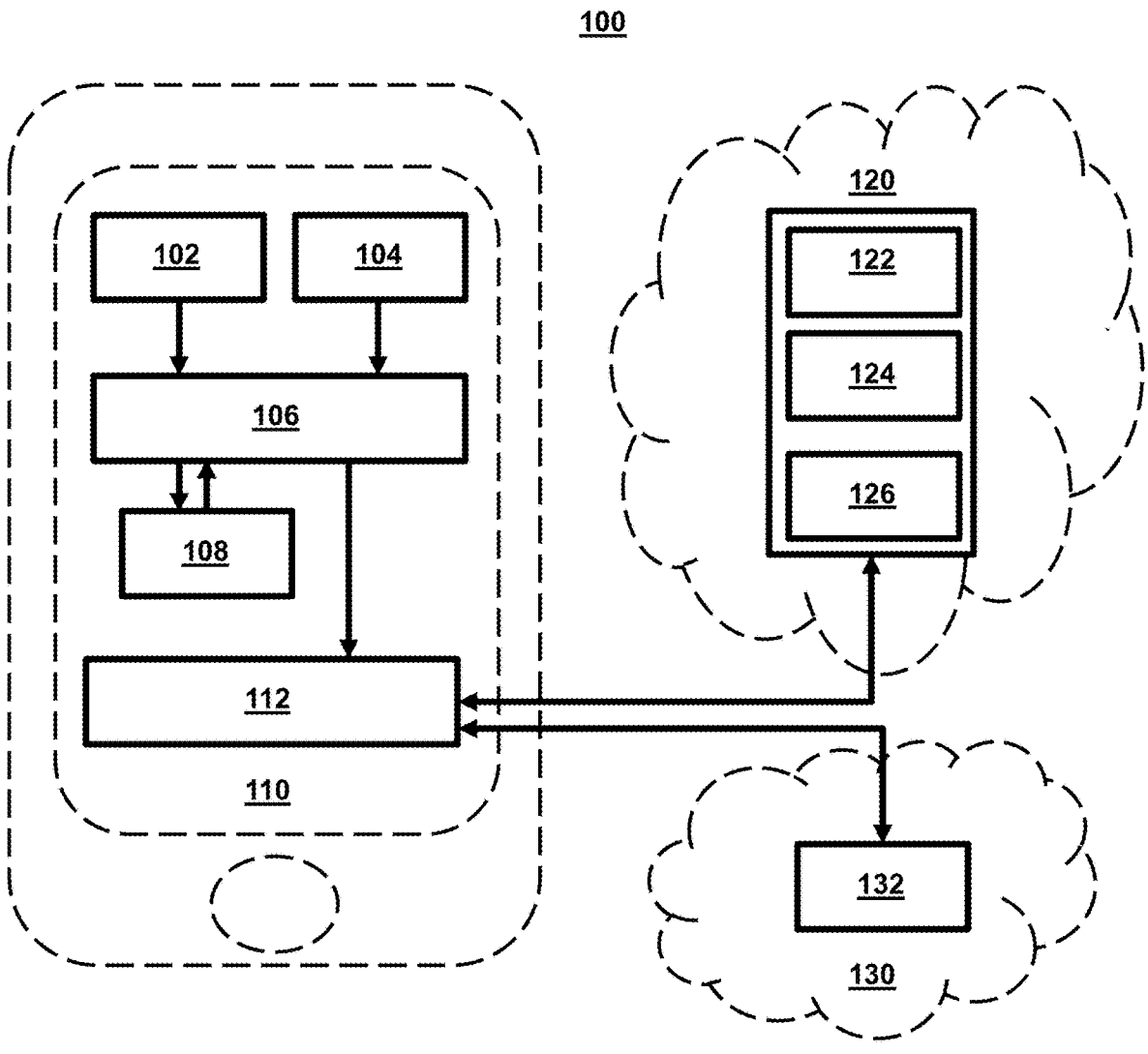
FIG. 1 shows an illustrative diagram for an architecture of a data sanitization application, in accordance with one or more embodiments.

FIG. 1 shows an illustrative diagram for an architecture of a data sanitization application, in accordance with one or more embodiments. For example, architecture 100 may allow a system to leverage artificial intelligence to sanitize sensitive data and prevent the data from leaving the mobile device and/or be exposed to unauthorized third parties.

More specifically, architecture 100 illustrates an architecture for a bifurcated sanitization process involving (1) a machine learning model implemented in a data sanitization application residing on a mobile device; and (2) a data scrubbing application residing on a remote server. This bifurcated sanitization process mitigates the lack of insight into the model by allowing the sanitization process to perform an initial sanitization of data with a follow-up scrubbing to detect any additional sensitive data and/or incorrect sanitization. For example, as opposed to sanitizing data, the data scrubbing application may fix incorrect, incomplete, duplicate, mislabeled, and/or otherwise erroneous data in a dataset. To further ensure the sensitivity of the data, the model may determine whether to sanitize detected sensitive data (e.g., if it meets a first threshold) or simply mask the data (e.g., if it meets a second threshold) before sending the data to the data scrubbing application residing on a remote server. By doing so, the model may defer, or rely on, instances involving difficult to detect sensitive data to a more rigorous scrubbing process, and one subject to oversight, on the remote server. For example, a user may wish to transmit sensitive data (e.g., a phone number in a feedback form in order to receive a callback). A regex routine (or a model not trained to account for such an instance) may redact this data, which would prevent it from being recovered (and the user not receiving a callback). Using the bifurcated sanitization process, the model may mask this data (thus ensuring security) and transmit the data to the remote server for further review.

It should be noted that the system may use one or more artificial intelligence models (including machine learning models, neural networks, etc.), referred to herein collectively as artificial intelligence models, machine learning models, or simply "models." These artificial intelligence models that may, in some embodiments, be downloaded and run locally on a mobile device. For example, a machine learning model, downloaded and run locally, may include the benefits of locally run regex routines, but also overcome the technical limitations of the regex routines. That is, the machine learning model may learn abstract (or unknown) instances, may detect sensitive data of different types simultaneously, and may generate confidences in delineated and/or overlapping data. It should be noted that the methods and systems may be used to sanitize any data, and the data may comprise any content.

As shown in FIG. 1, architecture 100 includes three components, although in some embodiments, architecture 100 may include more or less components. Furthermore, some component may comprise cloud components and/or components spread across multiple devices that none the less share functionality and/or features.

Architecture 100 includes a local data sanitization application 110, which may reside on a mobile device. Local data sanitization application 110 may comprise feature 102 and feature 104. These features may correspond to hardware and/or software components that provide different functionality. Local data sanitization application 110 also includes monitoring software design kit (SDK) 106. A SDK is a set of tools provided by the manufacturer of (usually) a hardware platform, operating system (OS), or programming language. The SDK in local data sanitization application 110 may be used to detect data instances and/or monitor for new versions of a machine learning model.

Local data sanitization application 110 also includes sanitizer 108. Sanitizer 108 may comprise a component that performs data sanitization. Data sanitization may involve the secure and permanent erasure of sensitive data from datasets and media to guarantee that no residual data can be recovered, even through extensive forensic analysis. To perform this, sanitizer 108 may comprise one or more machine learning models. Local data sanitization application 110 also includes networking layer 112. Networking layer 112 may be responsible for packet forwarding including routing through intermediate routers, contacting remote servers, and/or otherwise providing input/output functionality for local data sanitization application 110.

Architecture 100 also includes remote server 120. For example, remote server 120 may comprise a data scrubbing application configured to receive a first sanitized data instance, parse the first sanitized data instance, using a regex routine, and generate a first scrubbed data instance, and transmit the first scrubbed data instance to the mobile device (e.g., to local data sanitization application 110). For example, as part of the bifurcated sanitization process, remote server 120 and local data sanitization application 110 may both perform functions (as well as validate and confirm data sanitization received from other components) as part of the sanitization process.

As referred to herein, sanitized data may comprise data that has been sanitized by purposely, permanently deleting, and/or destroying data from a storage device, to ensure it cannot be recovered. For example, when data is deleted from storage media, the media is typically not erased and can be recovered by an attacker who gains access to the device. As referred to herein, scrubbed data may comprise data that has been scrubbed by data cleansing or data cleaning, which may be the process of detecting and correcting corrupt or inaccurate records from a record set, table, and/or database and may involve identifying incomplete, incorrect, inaccurate and/or irrelevant parts of the data and then replacing, modifying, and/or deleting the dirty or coarse data.

Remote server 120 may include processing component 122, scrubbing component 124, and a supplemental data store (e.g., which may comprise a corpus of regex routines). Scrubbing component 124 may perform data scrubbing and/or cleansing. Data cleansing is a process of detecting and correcting (or removing) corrupt or inaccurate records from a record set, table, or database and refers to identifying incomplete, incorrect, inaccurate or irrelevant parts of the data and then replacing, modifying, or deleting the dirty or coarse data. Remote server 120 may perform the scrubbing with data wrangling tools, or as batch processing through scripting or a data quality firewall. After scrubbing, a dataset may be consistent with other similar datasets in the system and/or returned to an originating device (e.g., a mobile device upon which local data sanitization application 110 is implemented).

Architecture 100 also includes remote server 132. Remote server 132 may comprise a data store for versions of the machine learning model. Remote server 132 may be configured to continuously receive training data indicating previously classified data instances and continuously train current versions of the machine learning model based on the training data. For example, remote server 132 may deliver new versions of the machine learning model on-demand (e.g., as needed, requested, and/or required) by the local data sanitization application 110.

Architecture 100 may work in concert to sanitize data with various content. The system (and/or a model therein) may process and analyze multiple types of content. As referred to herein, "content" should be understood to mean an electronically consumable user asset, such as text, audio, graphic, and/or video data. Additionally, content may come from many sources such as Internet content (e.g., streaming content, downloadable content, Webcasts, etc.), video clips, audio files, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

The system may parse this content to detect sensitive data. For example, the system may retrieve a data instance within a dataset. As referred to herein, "a data instance" may comprise one particular piece of digital information as it exists at a given time. The data instance may be a portion of content such as a string of text. The system may then separate the data instance into more easily processed components, which are analyzed for correct syntax and then attach tags that define each component.

In some embodiments, the system may use information about a user or users to determine what data, if any, constitutes sensitive data. This data may be stored in a user profile. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

For example, the user profile (and/or the user profile characteristics therein) may indicate what data and/or test string combinations constitute sensitive data. That is, the user profile may indicate what data comprises confidential information (e.g., for a user or organization). The user profile may indicate what data comprises personally identifiable information (PII) or non-public personal information.

As noted above, leveraging artificial intelligence models that may be downloaded and run locally on a mobile device also raises additional technical challenges and concerns. For example, while artificial intelligence models may benefit from being adaptable and thus detect abstract or unknown instances of sensitive data, the fact that the models are downloaded and run locally means a level of governance is lost. That is, the provider of the model does not have full insight into how the model is sanitizing the data, what data is being sanitized, and/or with what accuracy. As such, the system may use a novel and unconventional architecture for a data sanitization application, a novel and unconventional delivery format for the data sanitization model, and a novel and unconventional output format of the data sanitization model.

For example, the model may also be trained locally on the device in "listening" mode, which can cater to the user who is using the application. Furthermore, the trained data can also be sent to the server from such individual devices using a federated learning approach, which can then be sent to the devices this time to actually perform the sanitization. In some embodiments, the system may ship the machine learning model when releasing a version and also may have the capability to download a new machine learning model on demand without needing to download a full application with a new version. The system may also optimize the model using pre-compiled models for specific architecture (e.g., Android and iOS) that will help leverage dedicated hardware available on each platform and provide optimization around energy consumption and CPU/GPU/ML Core usage.

Figure 2A:
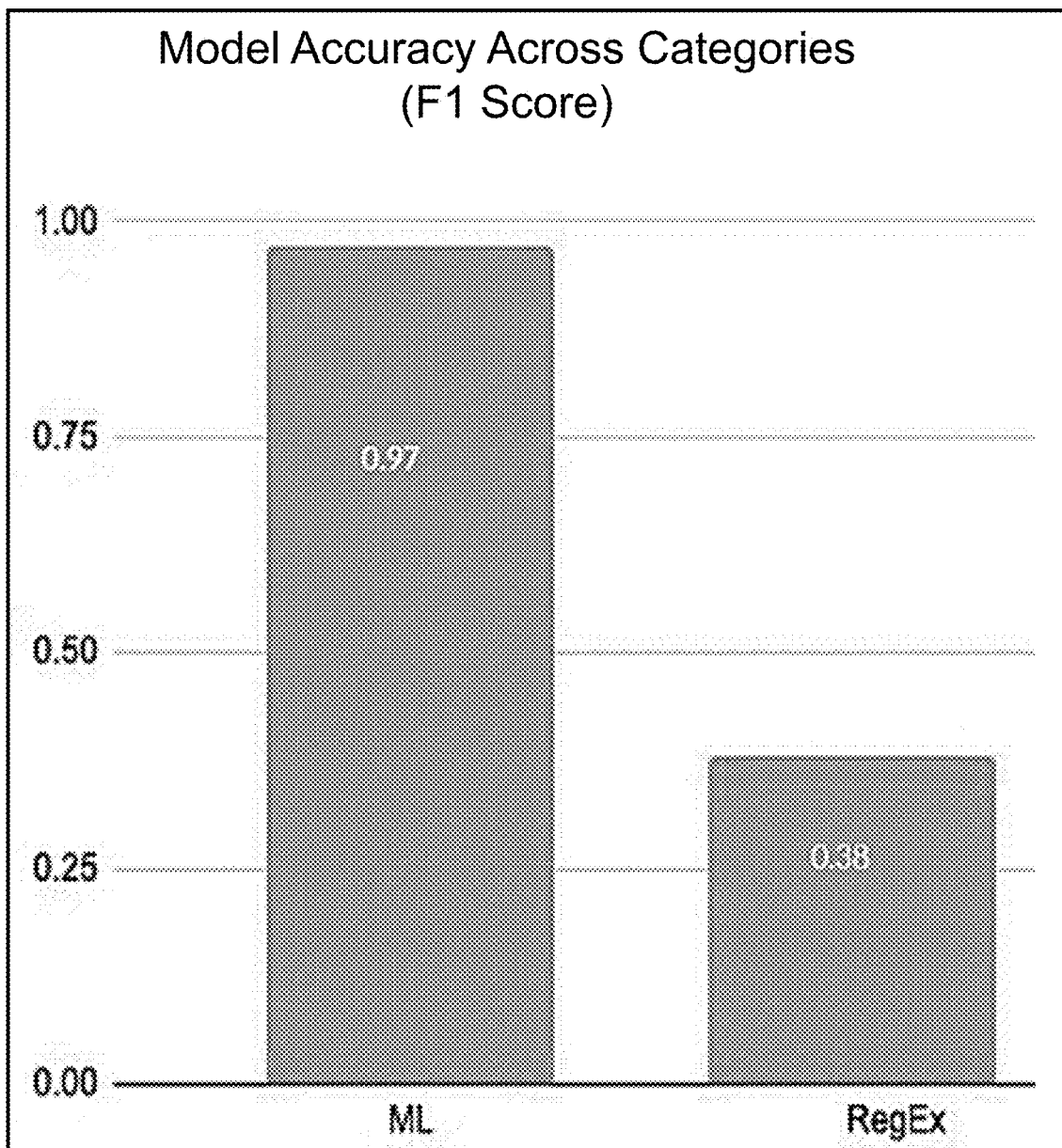

FIGS. 2A-C show illustrative diagrams of the benefits of the data sanitization application, in accordance with one or more embodiments. For example, FIGS. 2A and 2B compare a data sanitization application utilizing a machine learning model with a data sanitization application utilizing a conventional regex routine. For example, FIG. 2A includes diagram 200, which illustrates that the data sanitization application utilizing a machine learning model has an accuracy (e.g., based on an F1-score) across all classifications and/or categories of ninety-seven percent. In contrast, the data sanitization application utilizing a conventional regex routine has an accuracy across all classifications and/or categories of thirty-eight percent.

FIG. 2B contains table 220 and table 230. Table 220 provides various confidence metrics (e.g., precision, recall, and F1-scores) for classifications across multiple categories (e.g., addresses, credit cards, etc.) for a data sanitization application utilizing a machine learning model. Table 230 provides various confidence metrics (e.g., precision, recall, and F1-scores) for classifications across multiple categories (e.g., addresses, credit cards, etc.) for a data sanitization application utilizing a conventional regex routine. Notably, as shown by the comparison of the values in table 220 and table 230, the data sanitization application utilizing a machine learning model provides significantly better accuracy.

In some embodiments, the system may determine and/or transmit these confidence metrics. For example, conventional data sanitization systems (e.g., those employing a regex routine) simply sanitize data instances. However, as the data sanitization application is relying on a model that is locally implemented, and for which it does not have full insight into what is happening, the output needs to include additional information. This additional information may then be used to determine the accuracy of the model (e.g., by a remote server and/or provided by the model) and determine whether future on-demand versions of the model need to be updated. In particular, the data sanitization application may transmit the sanitized data instance, but also an output of the model that comprises (1) a classification of the confidentiality type of the inputted data instance, and (2) a plurality of different confidence metrics for the classification. For example, based on this information, the system may determine how accurate the outputs are and what types of information are being sanitized correctly.

Furthermore, the system may transmit multiple types of confidence metrics to ensure that enough data is available to properly evaluate the model. For example, to fully evaluate the effectiveness of a model, the system may examine both precision and recall. For example, precision may indicate what proportion of positive identifications were actually correct. Precision is defined as the ratio of correctly classified positive samples (True Positive) to a total number of classified positive samples (either correctly or incorrectly). As such, precision helps the system visualize the reliability of the machine learning model in making positive classifications. In contrast, recall indicates what proportion of actual positives was identified correctly. The recall is calculated as the ratio between the numbers of positive samples correctly classified as positive to the total number of positive samples. The recall measures the model's ability to detect positive samples. The higher the recall, the more positive samples detected.

Unfortunately, precision and recall are often in tension. That is, improving precision typically reduces recall and vice versa. As such, the system may also determine the F1 score. The F1 score combines the precision and recall of a classifier into a single metric by taking their harmonic mean. The F1 score is particularly useful for evaluating information retrieval systems such as search engines and machine learning models, in particular in natural language processing. The F1 score may be beneficial to compare the accuracy against other classifiers, particularly if the other classifiers have different recall and precision metrics. For example, if a first classifier has a higher recall, and a second classifier has higher precision, the F1 scores for both the first and second classifiers may be used to determine which one produces better results.

FIG. 2C provides table 250. Table 250 indicates various characteristics for a data sanitization application utilizing a machine learning model across multiple operating systems. As shown in table 250, the data sanitization application utilizing a machine learning model provides better sanitization (e.g., as compared to a data sanitization application utilizing a conventional regex routine) while limiting any device requirements. Notably, the limited increase in device requirements makes the data sanitization application utilizing a machine learning model particularly beneficial for mobile devices, which are likely to have limited hardware resources.

In some embodiments, the system may also determine when to retrieve an on-demand model based on local device statistics. For example, the system may determine whether a mobile device currently has enough memory for a new version of a machine learning model. The system may determine whether a mobile device currently has enough available processing power to download a new version of a machine learning model. The system may determine whether a mobile device is currently in an idol state and/or has enough power to download a new version of a machine learning model.

Additionally or alternatively, the system may determine whether current processes allow the download of the new version. For example, the system may determine whether the current version of the machine learning model is in use and/or whether there are datasets that need to be sanitized.

In such cases, the system may query a remote server to determine the current requirements for downloading a new version of the machine learning model (e.g., the requirements shown in table 250). The system may then compare the requirements to current device characteristics. The current device characteristics (or a particular range beyond) may constitute "threshold" requirements. In response to the threshold requirements being met, the system may determine to query the remote server for the first version of the machine learning model.

Figure 3:
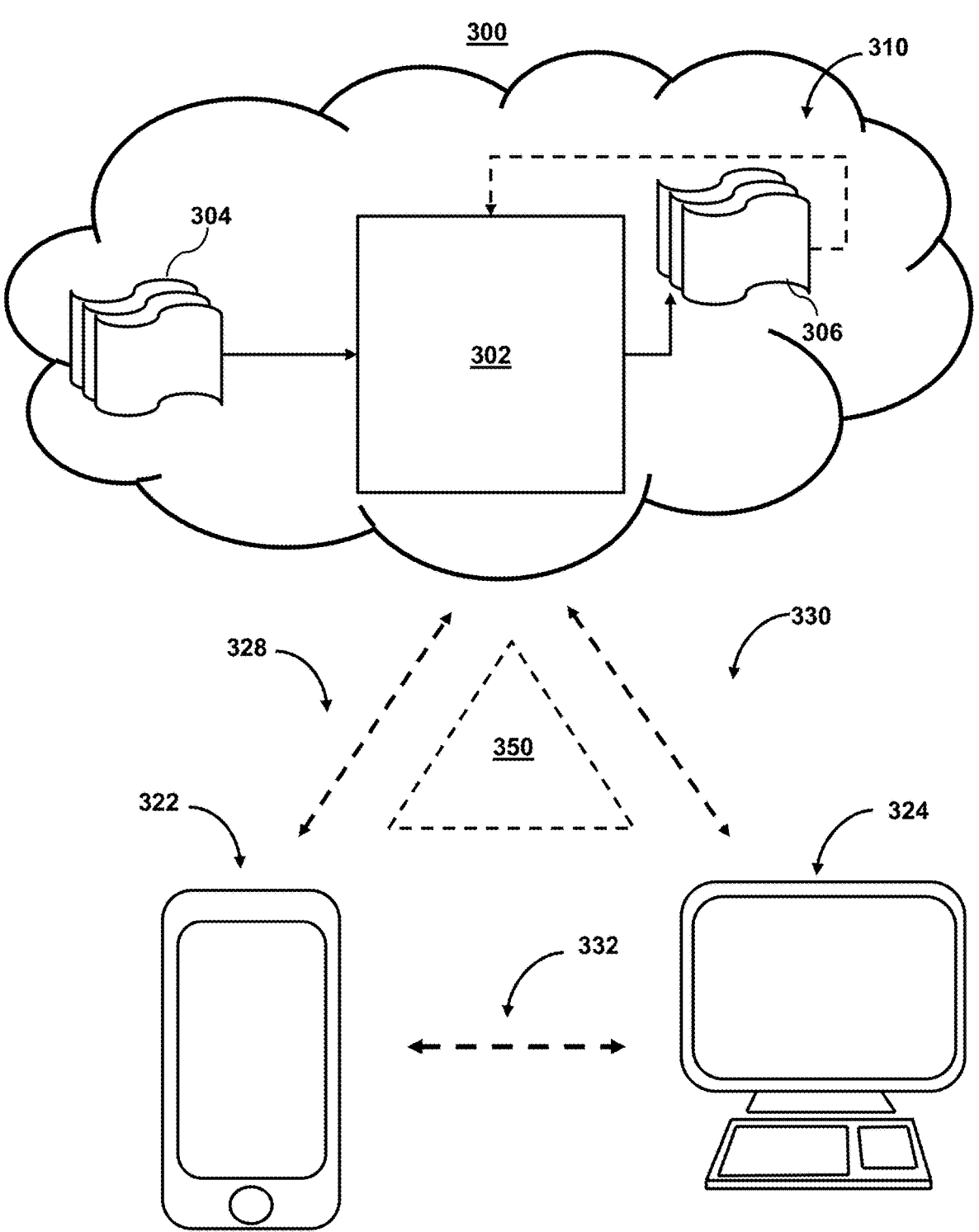
FIG. 3 shows illustrative components for a data sanitization application, in accordance with one or more embodiments.

FIG. 3 shows illustrative components for a system used to sanitize sensitive data, in accordance with one or more embodiments. For example, FIG. 3 may show illustrative components for sanitizing sensitive data. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data. As referred to herein, a "user interface" may comprise a human-computer interaction and communication in a device, and may include display screens, keyboards, a mouse, and the appearance of a desktop. For example, a user interface may comprise a way a user interacts with an application or a website.

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a remote server comprising a data scrubbing application and/or a remote server which comprises a data store for versions of the machine learning model. Cloud components 310 may also include model 302, which may be a machine learning model, artificial intelligence model, etc. Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., classifications of different sensitive data types).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., classifications of different sensitive data types).

In some embodiments, the model (e.g., model 302) may automatically perform actions based on outputs 306. In some embodiments, the model (e.g., model 302) may not perform any actions. The output of the model (e.g., model 302) may be used to sanitize sensitive data.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
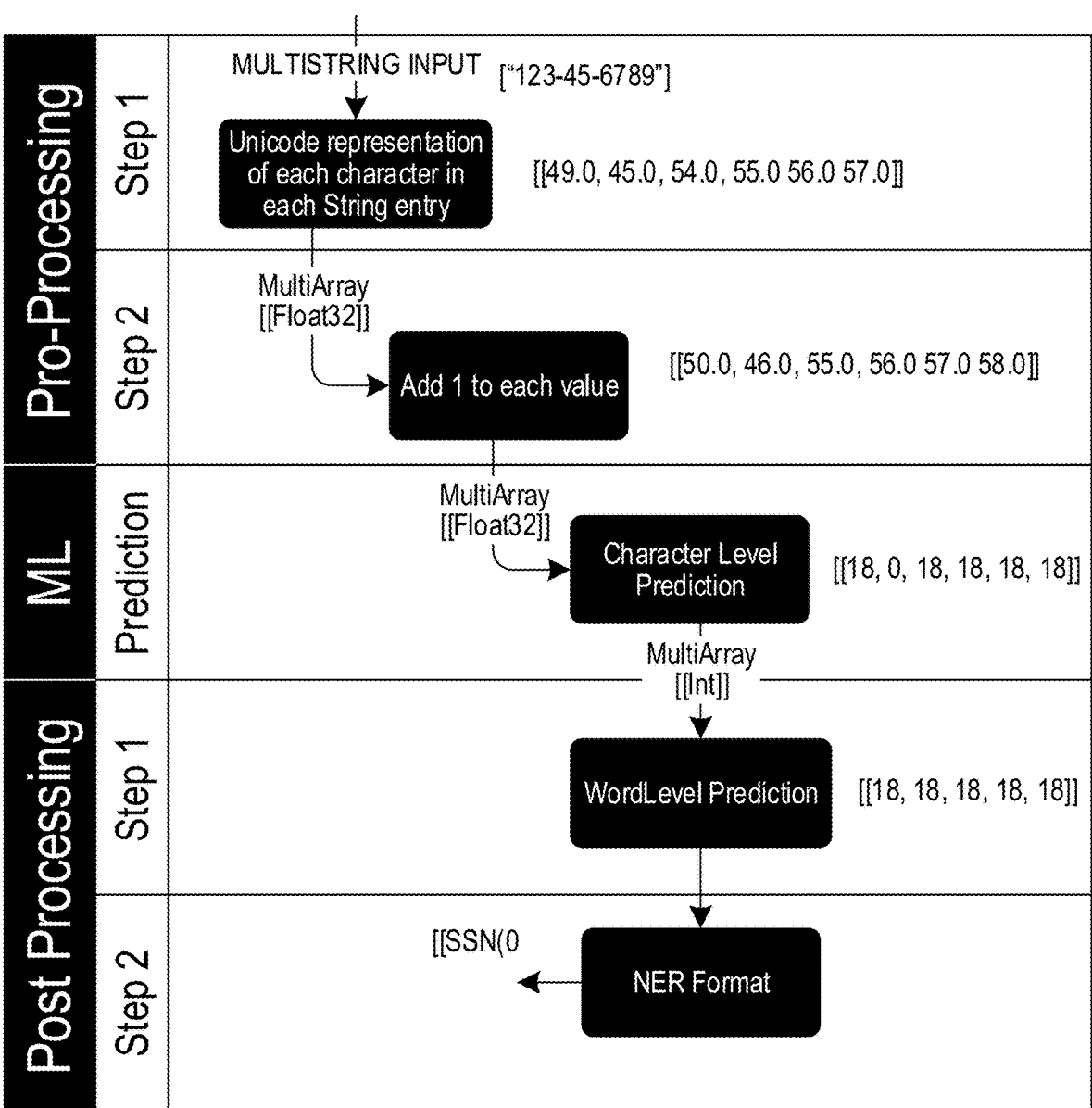
FIG. 4 shows an illustrative diagram for an artificial intelligence model for a data sanitization application, in accordance with one or more embodiments.

FIG. 4 shows an illustrative diagram for an artificial intelligence model for a data sanitization application, in accordance with one or more embodiments. For example, one or more embodiments may use workflow 400 to sanitize sensitive data, particularly on mobile devices. Workflow 400 may include one or more steps such as pre-processing, predictions, and/or post-processing.

As shown in FIG. 4, workflow 400 may begin with the receipt of a data instance. This data instance may belong to a dataset of content currently stored on the mobile device and/or currently scheduled to be transmitted from the mobile device. During a pre-processing step, workflow 400 may generate a feature input representing the data instance. For example, a feature is an individual measurable property or characteristic of a phenomenon. The feature input may comprise an array of values that represents these properties and/or characteristics in the data instance. For example, the feature input may comprise an array of values that represents the data instance.

In some embodiments, the system may normalize the feature input as part of an additional pre-processing step. For example, as shown in FIG. 4, the system may increment each value by one. This may remove null values and/or mask actual user data. The system may use a feature input layer to input feature data to a network and/or apply the data normalization.

The system may then input the feature input into a machine learning model. The machine learning model may be trained to classify data instances in locally-stored datasets in order to sanitize the locally-stored dataset. Furthermore, the machine learning model may be an on-demand model, a current version of which is retrieved (e.g., a remote server) upon the detection of a feature input being ready for processing.

As shown in workflow 400, the system may apply a character level prediction and/or other natural language processing. In some embodiments, the system may use the character-level language model to predict a next character given all previous characters in a sequence of data (e.g., generate text character by character). For example, the system may be given a training sequence $(x^1, \ldots, xT)$, and a model (e.g., a recurrent neural network) may use the sequence of its output vectors $(o^1, \ldots, oT)$ to obtain a sequence of predictive distributions $P(xt/x\{t{-}1\}){=}softmax$ (ot).

The system may perform post processing steps as shown in workflow 400. For example, the system may also perform a word level prediction. The word level prediction may comprise named entity recognition (NER), which involves the identification of key information in the text and classification into a set of predefined categories.

For example, the system may parse this content to detect sensitive data. The data instance may be a portion of content such as a string of text. The system may then separate the data instance into more easily processed components (e.g., words, phrases, shorter text strings, etc.), which are analyzed for correct syntax and then attach tags that define each component. The system may then determine whether this content corresponds to content in a particular classification (e.g., sensitive data, private data, non-public data, confidential data, public data, etc.) and tag the content accordingly. Additionally, the system may determine a particular type of data and/or a field of data from which it came. For example, the system may determine if content corresponds to an address of a user. Upon doing so, the system may compare the known address of the user to determine whether the content corresponds to private information.

The system may also perform sanitization, masking, and/or other sanitization operations. As referred to herein, a "sanitization operation" may comprise any operation that facilitates the sanitation of data. For example, a sanitization operation may comprise sanitizing data, masking data, and/or scrubbing data. Workflow 400 may also include an additional post-processing step such as generating an output and/or conforming an output to a NER format. By doing so, the system may generate authentic looking outputs. For example, the system may need to ensure that a substation masking function is used that can create a sanitized data instance that appears authentic. To ensure that the sanitized data instance appears authentic, the system may further perform a checksum validation that is specific to a data field type of the first data instance.

FIG. 5 shows an illustrative diagram for an output of an artificial intelligence model for a data sanitization application, in accordance with one or more embodiments. For example, table 500 contrasts outputs for various data instances from a data sanitization application utilizing a machine learning model with a data sanitization application utilizing a conventional regex routine.

As shown in table 500, conventional data sanitization systems (e.g., those employing regex routine) simply sanitize data instances. However, as the data sanitization application is relying on a model that is locally implemented, and for which it does not have full insight into what is happening, the output needs to include additional information. This additional information may then be used to determine the accuracy of the model (e.g., by a remote server and/or provide of the model) and determine whether future on-demand versions of the model need to be updated. In particular, the data sanitization application may transmit the sanitized data instance (e.g., an ID, credit card number, and/or driver's license number), but also an output of the model that comprises (1) a classification of the confidentiality type of the inputted data instance, and (2) a plurality of different confidence metrics for the classification. For example, based on this information, the system may determine how accurate the outputs are and what types of information are being sanitized correctly.

As shown in table 500, an ID is categorized as a type "3" and this classification has a precision, recall, and F1 score of "1.000," "1.000," and "1.000," respectively. A credit card number is categorized as a type "5" and this classification has a precision, recall, and F1 score of "1.000," "1.000," and "1.000," respectively. A driver license is categorized as a type "9" and this classification has a precision, recall, and F1 score of "0.9997," "0.9999," and "1.000," respectively. Notably, the system has also detected delineated data in the third entry of table 500 (e.g., a state of the driver's license). As such, the system has provided a separate sanitized data instance, classification, and confidence metrics. In contrast, the data sanitization application utilizing a conventional regex routine simply redacts all information and fails to even detect the delineated sensitive data of the third entry.

Figure 6:
FIG. 6 shows a flowchart of the steps involved in sanitizing sensitive data and preventing data leakage from mobile devices using a bifurcated sanitization process, in accordance with one or more embodiments.

FIG. 6 shows a flowchart of the steps involved in sanitizing sensitive data and preventing data leakage from mobile devices using a bifurcated sanitization process, in accordance with one or more embodiments. For example, the system may use process 600 (e.g., as implemented on one or more system components described above) in order to sanitize sensitive data.

In some embodiments, process 600 may use an on-demand model delivery format. For example, the system may launch a first application on the mobile device. In response to launching the first application (e.g., which may comprise sensitive data), the system may transmit a request to the remote server for the machine learning model. The system may then receive, at the mobile device, the machine learning model. As another example, the system may run a start-up routine for the data sanitization application. The system may determine, based on the start-up routine, that a current version of the machine learning model is outdated. The system may determine to query the remote server for a new version of the machine learning model based on the current version of the machine learning model being outdated.

At step 602, process 600 (e.g., using one or more components described above) detects a first data instance in a first dataset. For example, the system may detect, using a data sanitization application that is locally implemented on a mobile device, a first data instance in a first dataset, wherein the first dataset is stored on the mobile device. For example, the system may detect local content stored and/or scheduled to be transmitted from a mobile device. In response to detecting this data, the system may proceed to sanitize the data. By doing so, the system may sanitize sensitive data and prevent the data from being exposed to unauthorized third parties. Moreover, by performing this function locally, the system may mitigate any security risks associated with transmitting data (even encrypted data).

At step 604, process 600 (e.g., using one or more components described above) generates a first feature input based on the first data instance. For example, the system may generate, using the data sanitization application, a first feature input based on the first data instance. The feature input may comprise an array of values that represents the data instance. The values may be able to be processed by a machine learning model. By doing so, the system may both normalize the data instance as well as perform one or more preprocessing steps.

At step 606, process 600 (e.g., using one or more components described above) inputs the first feature input into a machine learning model. For example, the system may input the first feature input into a machine learning model, wherein the machine learning model is trained to classify data instances in locally-stored datasets in order to sanitize the locally-stored datasets. By doing so, the system may power a data sanitization application utilizing a machine learning model as opposed to a data sanitization application utilizing a conventional regex routine. As described above, using a data sanitization application utilizing a machine learning model provides numerous advantages with respect to accuracy as well as limits the requirements (e.g., memory, processing power, etc.) of the local device.

At step 608, process 600 (e.g., using one or more components described above) receives a first output from the machine learning model. For example, the system may receive a first output from the machine learning model, wherein the first output comprises a first classification of the first data instance. The system may output an indication of whether or not content in the data instance requires sanitization. Furthermore, by determining the classification type, the system may apply sanitization routines that are specific to the classification type and/or category of data. By doing so, the system may more efficiently sanitize data, but may also generate sanitized data that appears authentic. This synthetic data may be used for future training of machine learning models (without any privacy concerns related to the use of actual user data) as well as provide another barrier to unauthorized use of actual user data.

At step 610, process 600 (e.g., using one or more components described above) selects a first sanitization operation. For example, the system may select a first sanitization operation from a plurality of sanitization operations for performing on the first data instance based on the first classification. For example, the system may determine whether to sanitize, mask, ignore, etc. particular data. By doing so, the system may transmit non-sensitive data, but also invoke more intelligent analysis of the data. For example, the model may determine whether to sanitize detected sensitive data (e.g., if it meets a first threshold) or simply mask the data (e.g., if it meets a second threshold) before sending the data to the data scrubbing application residing on a remote server.

For example, in some embodiments, selecting the first sanitization operation from the plurality of sanitization operations may comprise the system retrieving a first threshold classification, wherein the first threshold classification corresponds to the first sanitization operation and comparing the first classification to the first threshold classification, wherein the first data instance is sanitized to generate the first sanitized data instance in response to the first classification meeting the first threshold classification.

By doing so, the model may defer, or rely on, instances involving difficult to detect sensitive data to a more rigorous scrubbing process (e.g., located on a remote server), and one subject to oversight, on the remote server. For example, a user may wish to transmit sensitive data (e.g., a phone number in a feedback form in order to receive a callback). A regex routine (or a model not trained to account for such an instance) may redact this data, which would prevent it from being recovered (and the user not receiving a callback). Similarly, by classifying different data, the model is better able to detect delineated data such as shown in FIG. 5.

The plurality of sanitization operations may differ in the manner in which they sanitize data as well as whether or not the data is sanitized at all. In some embodiments, generating the first sanitized data instance based on the first sanitization operation may comprise the system generating a vector array corresponding to the first data instance; and inserting random values into the vector array to generate the first sanitized data instance. For example, the system may sanitize the data instance using data erasure. The process of data erasure involves sanitizing information at the byte level through the insertion of random 0s and 1s in on all sectors of the electronic equipment that is no longer in use. By doing so, the system ensures that all data previous stored is completely hidden and unrecoverable, which ensures full data sanitization. The system may also validate the efficacy and accuracy of this sanitization through auditable reports.

In some embodiments, the system may sanitize the data instance by masking the data. The system may perform data masking (or data obfuscation) by modifying sensitive data in such a way that it is of little or no value to unauthorized users while still being usable by software or authorized personnel. In some embodiments, the system may use data substitution to perform the masking as data substitution is one of the most effective methods of applying data masking and also preserves the authentic look and feel of the data instance. For example, generating the first sanitized data instance based on the first sanitization operation may comprise the system generating a vector array corresponding to the first data instance, retrieving a first data masking function from a plurality of data masking functions, and applying the first data masking function to the vector array to generate the first sanitized data instance.

In some embodiments, the system may further determine a classification, category, and/or a field type (which may be indicative of a classification and/or category) to select a sanitization operation. For example, the system may select from a plurality of available masking functions based on the type of the underlying data instance. For example, the system may determine a data field type of the first data instance and select the first data masking function from the plurality of data masking functions based on the data field type.

The system may do this to ensure an authentic-looking value is substituted for an existing value. In such cases, the system may determine a type of the data instance and retrieve a substitution masking function that corresponds to that type of data. For example, if dealing with source data which contains user financial data, the masking function may access a lookup file that provides substitute values that corresponds to the existing data type. By doing so, the system applies anonymity to the data instances, but also maintains authentic looking data, which is not easily identified as masked data.

For example, the system may need to ensure that a substation masking function is used that can create a sanitized data instance. To ensure that the sanitized data instance appears authentic, the system may further perform a checksum validation that is specific to a data field type of the first data instance. As such, the first data masking function may comprise steps related to identifying a first value in the first data instance, determining a substitute value in the first data instance, replacing the first value in the first data instance to generate the first sanitized data instance, and performing a checksum validation of the first sanitized data instance.

In some embodiments, the system may use data substitution to perform the masking by applying a null value to a field and/or replacing a value with a null value. For example, generating the first sanitized data instance based on the first sanitization operation may comprise the system generating a vector array corresponding to the first data instance and retrieving a second data masking function from a plurality of data masking functions, and applying the second data masking function to the vector array to generate the first sanitized data instance, wherein the second data masking function nulls values in the vector array.

In some embodiments, a sanitization operation may comprise cryptographic erasure. For example, the system may sanitize the data instance using cryptographic erasure. Cryptographic erasure involves the destruction of the secure key or passphrase, that is used to protect stored information. Data encryption involves the development of a secure key that only enables authorized parties to gain access to the data that is stored. The permanent erasure of this key ensures that the private data stored can no longer be accessed. For example, generating the first sanitized data instance based on the first sanitization operation may comprise the system encrypting, using an encryption key, the first data instance to generate the first sanitized data instance and erasing the encryption key. In some embodiments, the system may transmit the encryption key to a remote server and/or use an encryption key that is known to the remote server.

At step 612, process 600 (e.g., using one or more components described above) generates a first sanitized data instance. For example, the system may generate a first sanitized data instance based on the first sanitization operation. The sanitized data may remove portions of the data instances that include sensitive data. By doing so, the system may ensure that sensitive data is not put at risk.

At step 614, process 600 (e.g., using one or more components described above) transmits the first sanitized data instance. For example, the system may transmit the first sanitized data instance to a remote server, wherein the remote server comprises a data scrubbing application. For example, the remote server may participate in a second phase of a bifurcated sanitization process. By doing so, the system may provide a more efficient and secure method of data sanitization that leverages artificial intelligence to sanitize sensitive data and prevent the data from leaving the mobile device and/or being exposed to unauthorized third parties. For example, the remote server may continuously receive training data indicating previously classified data instances (as well as classification decisions and confidence metrics) and continuously training current versions of the machine learning model based on the training data.

In some embodiments, the system may detect subsequent and/or additional instances. The system may also sanitize this data simultaneously (as opposed to serial regex routines as in conventional systems). For example, the system may detect a second data instance in a first dataset. The system may generate a second feature input based on the second data instance. The system may input the second feature input into the machine learning model. The system may receive a second output from the machine learning model, wherein the second output comprises a second classification of the second data instance. The system may compare the second classification to a first threshold classification. The system may, in response to the second classification does not meet the first threshold classification, compare the second classification to a second threshold classification. The system may, in response to the second classification meeting the second threshold classification, mask the first data instance to generate a first masked data instance. The system may transmit the first masked data instance to the remote server.

These subsequent and/or additional instances may also be subject to different sanitization operations (e.g., based on the system making different classification determinations). For example, the system may detect a second data instance in a first dataset. The system may generate a second feature input based on the second data instance. The system may input the second feature input into the machine learning model. The system may receive a second output from the machine learning model, wherein the first output comprises a second classification of the second data instance. The system may compare the second classification to a first threshold classification. The system may, in response to the second classification not meeting the first threshold classification, compare the second classification to a third threshold classification. The system may, in response to the second classification meeting the third threshold classification, transmit the first data instance to the remote server.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

FIG. 7 shows a flowchart of the steps involved in sanitizing sensitive data and preventing data leakage from mobile devices using on demand artificial intelligence models, in accordance with one or more embodiments. For example, the system may use process 700 (e.g., as implemented on one or more system components described above) in order to sanitize sensitive data. Process 700 may use a bifurcated sanitization process as well as rely on a remotely trained machine learning model. For example, the system may receive a new version of a machine learning model from a remote server, where the remote server is continuously receiving training data indicating previously classified data instances and continuously training current versions of the machine learning model based on the training data.

At step 702, process 700 (e.g., using one or more components described above) receives a first action. For example, the system may receive, at a mobile device, a first action. For example, the system may use an on-demand delivery format for the artificial intelligence mode. As such, the system may monitor for various actions (e.g., as performed by a user, the mobile device, a remote server, a third party, etc.).

For example, as mentioned above, because the machine learning model is downloaded and locally run on the mobile device, the provider of the model does not have full insight into how the model is sanitizing the data, what data is being sanitized, and/or with what accuracy. That is, the provider loses control over the model. This lack of control creates novel problems for the model. If the model remains static, the model loses its ability to adapt to new instances of sensitive data and/or train itself to classify abstract instances of sensitive data. However, if the machine learning model is allowed to train and/or update itself based on the local data, the lack of insight, etc. into the model is further exacerbated and the potential for introducing bias into the model is heightened. To maintain the benefits of the use of the artificial intelligence model, while mitigating the lack of control, the system uses an artificial intelligence model that is pulled down on demand. By using the on-demand artificial intelligence model, the provider may maintain control of the model (e.g., prior to download). Furthermore, as a new model is pulled down on demand, the model does not need to train and/or update itself in order to learn to classify new instances of sensitive data. Instead, the model may be continuously trained and/or updated, and the most recently updated model at the time of the launch of the mobile device may be sent.

In some embodiments, the action may comprise an action performed by the mobile device and/or data sanitization application implemented thereon. For example, the system may run a start-up routine for the data sanitization application. The system may then determine, based on the start-up routine, that a current version of the machine learning model is outdated. The system may then determine to query the remote server for the first version of the machine learning model based on the current version of the machine learning model being outdated. Additionally or alternatively, the system may detect, using the data sanitization application, a launching of a first application (e.g., a different application that may create and/or comprise sensitive data). The system may determine to query the remote server for the first version of the machine learning model based on the launching of the first application.

In some embodiments, the action may comprise a user action (e.g., requesting to store, create, and/or transmit data). For example, the system may receive a user input to transmit the first data instance. The system may then determine to query the remote server for the first version of the machine learning model based on receiving the user input. Additionally or alternatively, the system may receive a user input to store the first data instance on the mobile device. The system may determine to query the remote server for the first version of the machine learning model based on receiving the user input. Additionally or alternatively, the system may receive a user input launching the data sanitization application. The system may then determine to query the remote server for the first version of the machine learning model based on receiving the user input.

In some embodiments, the action may be based on a characteristic of a dataset, data instance, and/or a mobile device. For example, the system may determine a length of time since the first dataset was last sanitized. The system may compare the length of time to a threshold length of time. In response to the length of time exceeding the threshold length of time, the system may determine to query the remote server for the first version of the machine learning model. Additionally or alternatively, the system may determine a data size of the first dataset. The system may compare the data size to a threshold data size. In response to the data size exceeding the threshold data size, the system may determine to query the remote server for the first version of the machine learning model. Additionally or alternatively, the system may determine an amount of available storage space on the mobile device. The system may compare the amount of available storage space to a threshold amount of available storage space. The system may, in response to the amount of available storage space exceeding the threshold amount of available storage space, determine to query the remote server for the first version of the machine learning model. Additionally or alternatively, the system may detect the first dataset on the mobile device, and the system may determine to query the remote server for the first version of the machine learning model based on detecting the first dataset on the mobile device.

In some embodiments, the action may be based on events directed from a remote server. For example, new versions of the machine learning model may be pushed to the mobile device and/or data sanitization application. For example, the system may receive a notification from the remote server that a new version of the machine learning model is available. The system may determine to query the remote server for the first version of the machine learning model based on receiving the notification. Additionally or alternatively, the system may receive a notification from the remote server that a current version of the machine learning model is inaccurate. The system may determine to query the remote server for the first version of the machine learning model based on receiving the notification.

At step 704, process 700 (e.g., using one or more components described above) queries a remote server for a first version of a machine learning model. For example, the system may, in response to the first action, query a remote server for a first version of a machine learning model, wherein the machine learning model is trained to classify data instances in locally-stored datasets in order to sanitize the locally-stored datasets. By doing so, the system may receive a current version the machine learning model.

At step 706, process 700 (e.g., using one or more components described above) detects a first data instance in a first dataset. For example, the system may detect, using a data sanitization application that is locally implemented on the mobile device, a first data instance in a first dataset, wherein the first dataset is stored on the mobile device. By doing so, the system may ensure that any data transmitted from the mobile device is sanitized.

At step 708, process 700 (e.g., using one or more components described above) sanitizes the first data instance. For example, the system may sanitize the first data instance using the first version of a machine learning model. For example, the system may generate a first feature input based on the first data instance. The system may input the first feature input into the first version of the machine learning model. The system may receive a first output from the first version of the machine learning model, wherein the first output comprises a first classification of the first data instance. The system may select a first sanitization operation from a plurality of sanitization operations for performing on the first data instance based on the first classification.

At step 710, process 700 (e.g., using one or more components described above) receives a second action. For example, the system may receive, at the mobile device, a second action. The second action may be the same type of action (or a different type of action) as the first action. By monitoring for subsequent actions, the system may generate additional queries for new versions of the machine learning model.

At step 712, process 700 (e.g., using one or more components described above) queries the remote server for a second version of the machine learning model. For example, the system may, in response to the second action, query the remote server for a second version of a machine learning model.

At step 714, process 700 (e.g., using one or more components described above) replaces the first version of the machine learning model. For example, the system may replace the first version of the machine learning model with the second version of a machine learning model. For example, the system may replace the old version with a more updated version (e.g., a version trained to detect new instances and/or abstract instances that may not be known to the prior version).

At step 716, process 700 (e.g., using one or more components described above) detects a second data instance in a first dataset. For example, the system may detect, using the data sanitization application, a second data instance in the first dataset. At step 718, process 700 (e.g., using one or more components described above) sanitizes the second data instance. For example, the system may sanitize the second data instance using the second version of a machine learning model. For example, the system may generate a second feature input based on the second data instance. The system may input the second feature input into the second version of the machine learning model. The system may receive a second output from the second version of the machine learning model, wherein the second output comprises a second classification of the second data instance. The system may select a second sanitization operation from a plurality of sanitization operations for performing on the second data instance based on the second classification.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

FIG. 8 shows a flowchart of the steps involved in facilitating on demand artificial intelligence models to sanitize sensitive data and prevent data leakage from mobile devices, in accordance with one or more embodiments. For example, the system may use process 800 (e.g., as implemented on one or more system components described above) in order to sanitize sensitive data. For example, conventional data sanitization systems (e.g., those employing a regex routine) simply sanitize data instances. However, as the data sanitization application is relying on a model that is locally implemented, and for which it does not have full insight into what is happening, the output needs to include additional information. This additional information may then be used to determine the accuracy of the model (e.g., by a remote server and/or provided by the model) and determine whether future on-demand version of the model need to be updated. In particular, the data sanitization application may transmit the sanitized data instance, but also an output of the model that comprises (1) a classification of the confidentiality type of the inputted data instance, and (2) a plurality of different confidence metrics for the classification. For example, based on this information, the system may determine how accurate the outputs are and what types of information are being sanitized correctly.

The system may use the different confidence metrics to determine how accurate a current machine learning model is and/or whether or not a new machine leading model should be used. For example, the system may receive a notification from the remote server that a current version of the machine learning model is inaccurate based on the accuracy. The system may determine to query the remote server for a new version of the machine learning model based on receiving the notification.

For example, the system may launch a first application on the mobile device. In response to launching the first application, the system may transmit a request to the remote server for the machine learning model. The system may receive, at the mobile device, the machine learning model. Additionally or alternatively, the system may run a start-up routine for the data sanitization application. The system may determine, based on the start-up routine, that a current version of the machine learning model is outdated. The system may determine to query the remote server for a new version of the machine learning model based on the current version of the machine learning model being outdated.

At step 802, process 800 (e.g., using one or more components described above) detects a first data instance in a first dataset. For example, the system may detect, using a data sanitization application that is locally implemented on a mobile device, a first data instance in a first dataset, wherein the first dataset is stored on the mobile device. By doing so, the system may ensure that any data transmitted from the mobile device is sanitized.

At step 804, process 800 (e.g., using one or more components described above) generates a first feature input based on the first data instance. For example, the system may generate, using the data sanitization application, a first feature input based on the first data instance. The feature input may comprise an array of values that represents the data instance. The values may be able to be processed by a machine learning model. By doing so, the system may both normalize the data instance as well as perform one or more preprocessing steps.

At step 806, process 800 (e.g., using one or more components described above) inputs the first feature input into a machine learning model. For example, the system may input the first feature input into a machine learning model, wherein the machine learning model is trained to classify data instances in locally-stored datasets in order to sanitize the locally-stored datasets. By doing so, the system may power a data sanitization application utilizing a machine learning model as opposed to a data sanitization application utilizing a conventional regex routine. As described above, using a data sanitization application utilizing a machine learning model provides numerous advantages with respect to accuracy as well as limits the requirements (e.g., memory, processing power, etc.) of the local device.

At step 808, process 800 (e.g., using one or more components described above) receives a first output from the machine learning model. For example, the system may receive a first output from the machine learning model, wherein the first output comprises a first classification of the first data instance and a first confidence metric for the first classification. For example, the output of the model comprises (1) a classification of the confidentiality type of the inputted data instance, and (2) a plurality of different confidence metrics for the classification. For example, based on this information, the system may determine how accurate the outputs are and what types of information are being sanitized correctly. For example, the system may continuously receive, at the remote server, training data indicating previously classified data instances and continuously train, at the remote server, current versions of the machine learning model based on the training data. In some embodiments, the first output may further comprise a second confidence metric for the first classification, wherein the second confidence metric is transmitted with the first sanitized data instance, the first classification, and the first confidence metric to the remote server, and wherein the remote server uses the second confidence metric to measure an accuracy of the machine learning model.

In some embodiments, the machine learning model may be further trained to generate confidence metrics by determining a number of correctly classified positive data instances, determining a total number of classified positive data instances, and determining a ratio of the number of correctly classified positive data instances to the total number of classified positive data instances.

For example, the system may determine a precision of the machine learning model. Precision is defined as the ratio of correctly classified positive samples (True Positive) to a total number of classified positive samples (either correctly or incorrectly). As such, precision helps the system visualize the reliability of the machine learning model in making positive classifications.

Additionally or alternatively, the machine learning model may be further trained to generate confidence metrics by determining a number of positive data instances correctly classified as positive, determining a total number of positive data instances, and determining a ratio of the number of positive data instances correctly classified as positive to the total number of positive data instances. For example, the system may determine a recall of the machine learning model. The recall is calculated as the ratio between the number of positive samples correctly classified as positive to the total number of positive samples. The recall measures the model's ability to detect positive samples. The higher the recall, the more positive samples detected.

The system may use the precision of the machine learning model as its metric for determining accuracy for one or more reasons. For example, precision measures the ability of the model to classify positive samples. Alternatively or additionally, the system may use recall to measure the accuracy of the model. If there is a requirement of classifying all positive as well as negative samples as positive, whether they are classified correctly or incorrectly, the use of precision may be better. However, if the system benefits from detecting only positive samples, then the system should use recall as it is immaterial whether negative samples are correctly or incorrectly classified.

Additionally or alternatively, the machine learning model may be further trained to generate confidence metrics by determining a precision metric for the machine learning model, determining a recall metric for the machine learning model, and determining a harmonic mean of the precision metric and the recall metric. For example, the system may determine a F1-score of the machine learning model. The F1-score combines the precision and recall of a classifier into a single metric by taking their harmonic mean. The F1-score may be beneficial to compare the accuracy against other classifiers, particularly if the other classifiers have different recall and precision metrics. For example, if a first classifier has a higher recall, and a second classifier has higher precision, the F1-scores for both the first and second classifiers may be used to determine which one produces better results.

At step 810, process 800 (e.g., using one or more components described above) sanitizes the first data instance. For example, the system may sanitize the first data instance using the machine learning model to generate a first sanitized data instance. For example, the system may sanitize the first data instance using the first version of a machine learning model. For example, the system may generate a first feature input based on the first data instance. The system may input the first feature input into the first version of the machine learning model. The system may receive a first output from the first version of the machine learning model, wherein the first output comprises a first classification of the first data instance. The system may select a first sanitization operation from a plurality of sanitization operations for performing on the first data instance based on the first classification. The system may then use the first sanitization operation to generate a first sanitized data instance. The sanitized data may remove portions of the data instances that include sensitive data. By doing so, the system may ensure that sensitive data is not put at risk.

In some embodiments, sanitizing the first data instance using the machine learning model to generate the first sanitized data instance may further comprise selecting a first sanitization operation from a plurality of sanitization operations for performing on the first data instance based on the first classification and generating the first sanitized data instance based on the first sanitization operation. In some embodiments, generating the first sanitized data instance based on the first sanitization operation further comprise the system generating a vector array corresponding to the first data instance and inserting random values into the vector array to generate the first sanitized data instance. In some embodiments, generating the first sanitized data instance based on the first sanitization operation may further comprise the system generating a vector array corresponding to the first data instance, retrieving a first data masking function from a plurality of data masking functions, and applying the first data masking function to the vector array to generate the first sanitized data instance.

Furthermore, the system may select a particular sanitization operation based on characteristics of the data instances. For example, the system may determine a data field type of the first data instance and select the first data masking function from the plurality of data masking functions based on the data field type.

At step 812, process 800 (e.g., using one or more components described above) transmits the first sanitized data instance and the first output. For example, the system may transmit the first sanitized data instance, the first classification, and the first confidence metric to a remote server, wherein the remote server uses the first classification and the first confidence metric to measure an accuracy of the machine learning model. For example, the system may transmit the first sanitized data instance to a remote server, wherein the remote server comprises a data scrubbing application. For example, the remote server may participate in a second phase of a bifurcated sanitization process. By doing so, the system may provide a more efficient and secure method of data sanitization that leverages artificial intelligence to sanitize sensitive data and prevent the data from leaving the mobile device and/or being exposed to unauthorized third parties. For example, the remote server may continuously receive training data indicating previously classified data instances (as well as classification decisions and confidence metrics) and continuously training current versions of the machine learning model based on the training data. The system may simultaneously transmit one or more confidence metrics.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for sanitizing sensitive data and preventing data leakage from mobile devices using a bifurcated sanitization process.
2. A method for facilitating on demand artificial intelligence models to sanitize sensitive data and prevent data leakage from mobile devices.
3. A method for sanitizing sensitive data and preventing data leakage from mobile devices using on demand artificial intelligence models
4. The method of any one of the preceding embodiments comprising: detecting, using a data sanitization application that is locally implemented on a mobile device, a first data instance in a first dataset, wherein the first dataset is stored on the mobile device; generating, using the data sanitization application, a first feature input based on the first data instance; inputting the first feature input into a machine learning model, wherein the machine learning model is trained to classify data instances in locally-stored datasets in order to sanitize the locally-stored datasets; receiving a first output from the machine learning model, wherein the first output comprises a first classification of the first data instance; selecting a first sanitization operation from a plurality of sanitization operations for performing on the first data instance based on the first classification; generating a first sanitized data instance based on the first sanitization operation; and transmitting the first sanitized data instance to a remote server, wherein the remote server comprises a data scrubbing application.

5. The method of any one of the preceding embodiments, wherein the method is for sanitizing sensitive data and preventing data leakage from mobile devices using a bifurcated sanitization process.

6. The method of any one of the preceding embodiments, wherein selecting the first sanitization operation from the plurality of sanitization operations further comprises: retrieving a first threshold classification, wherein the first threshold classification corresponds to the first sanitization operation; and comparing the first classification to the first threshold classification, wherein the first data instance is sanitized to generate the first sanitized data instance in response to the first classification meeting the first threshold classification.

7. The method of any one of the preceding embodiments, wherein the generating the first sanitized data instance based on the first sanitization operation comprises: generating a vector array corresponding to the first data instance; and inserting random values into the vector array to generate the first sanitized data instance.

8. The method of any one of the preceding embodiments, wherein the generating the first sanitized data instance based on the first sanitization operation comprises: generating a vector array corresponding to the first data instance; retrieving a first data masking function from a plurality of data masking functions; and applying the first data masking function to the vector array to generate the first sanitized data instance.

9. The method of any one of the preceding embodiments, further comprising: determining a data field type of the first data instance; and selecting the first data masking function from the plurality of data masking functions based on the data field type.

10. The method of any one of the preceding embodiments, wherein the first data masking function comprises: identifying a first value in the first data instance; determining a substitute value in the first data instance; replacing the first value in the first data instance to generate the first sanitized data instance; and performing a checksum validation of the first sanitized data instance.

11. The method of any one of the preceding embodiments, wherein the generating the first sanitized data instance based on the first sanitization operation comprises: generating a vector array corresponding to the first data instance; retrieving a second data masking function from a plurality of data masking functions; and applying the second data masking function to the vector array to generate the first sanitized data instance, wherein the second data masking function nulls values in the vector array.

12. The method of any one of the preceding embodiments, wherein the generating the first sanitized data instance based on the first sanitization operation comprises: encrypting, using an encryption key, the first data instance to generate the first sanitized data instance; and erasing the encryption key.

13. The method of claim 2, further comprising: detecting a second data instance in a first dataset; generating a second feature input based on the second data instance; inputting the second feature input into the machine learning model; receiving a second output from the machine learning model, wherein the second output comprises a second classification of the second data instance; comparing the second classification to a first threshold classification; in response to the second classification not meeting the first threshold classification, comparing the second classification to a second threshold classification; in response to the second classification meeting the second threshold classification, masking the first data instance to generate a first masked data instance; and transmitting the first masked data instance to the remote server.

14. The method of any one of the preceding embodiments, further comprising: detecting a second data instance in a first dataset; generating a second feature input based on the second data instance; inputting the second feature input into the machine learning model; receiving a second output from the machine learning model, wherein the first output comprises a second classification of the second data instance; comparing the second classification to a first threshold classification; and in response to the second classification not meeting the first threshold classification, comparing the second classification to a third threshold classification; and in response to the second classification meeting the third threshold classification, transmitting the first data instance to the remote server.

15. The method of any one of the preceding embodiments, further comprising: launching a first application on the mobile device; in response to launching the first application, transmitting a request to the remote server for the machine learning model; and receiving, at the mobile device, the machine learning model.

16. The method of any one of the preceding embodiments, further comprising: continuously receiving training data indicating previously classified data instances; and continuously training current versions of the machine learning model based on the training data.

17. The method of any one of the preceding embodiments, further comprising: running a start-up routine for the data sanitization application; determining, based on the start-up routine, that a current version of the machine learning model is outdated; and determining to query the remote server for a new version of the machine learning model based on the current version of the machine learning model being outdated.

18. The method of any one of the preceding embodiments, further comprising: receiving, at a mobile device, a first action; in response to the first action, querying a remote server for a first version of a machine learning model, wherein the machine learning model is trained to classify data instances in locally-stored datasets in order to sanitize the locally-stored datasets; detecting, using a data sanitization application that is locally implemented on the mobile device, a first data instance in a first dataset, wherein the first dataset is stored on the mobile device; sanitizing the first data instance using the first version of a machine learning model; receiving, at the mobile device, a second action; in response to the second action, querying the remote server for a second version of a machine learning model; replacing the first version of the machine learning model with the second version of a machine learning model; detecting, using the data sanitization application, a second data instance in the first dataset; and sanitizing the second data instance using the second version of a machine learning model.

19. The method of any one of the preceding embodiments, wherein receiving the first action comprises: running a start-up routine for the data sanitization application; determining, based on the start-up routine, that a current version of the machine learning model is outdated; and determining to query the remote server for the first version of the machine learning model based on the current version of the machine learning model being outdated.

20. The method of any one of the preceding embodiments, wherein receiving the first action comprises: receiving a user input to transmit the first data instance; and determining to query the remote server for the first version of the machine learning model based on receiving the user input.

21. The method of any one of the preceding embodiments, wherein receiving the first action comprises: receiving a user input to store the first data instance on the mobile device; and determining to query the remote server for the first version of the machine learning model based on receiving the user input.

22. The method of any one of the preceding embodiments, wherein receiving the first action comprises: receiving a user input launching the data sanitization application; and determining to query the remote server for the first version of the machine learning model based on receiving the user input.

23. The method of any one of the preceding embodiments, wherein receiving the first action comprises: detecting, using the data sanitization application, a launching of a first application; and determining to query the remote server for the first version of the machine learning model based on the launching of the first application.

24. The method of any one of the preceding embodiments, wherein receiving the first action comprises: determining a length of time since the first dataset was last sanitized; comparing the length of time to a threshold length of time; and in response to the length of time exceeding the threshold length of time, determining to query the remote server for the first version of the machine learning model.

25. The method of any one of the preceding embodiments, wherein receiving the first action comprises: determining a data size of the first dataset; comparing the data size to a threshold data size; and in response to the data size exceeding the threshold data size, determining to query the remote server for the first version of the machine learning model.

26. The method of any one of the preceding embodiments, wherein receiving the first action comprises: determining an amount of available storage space on the mobile device; comparing the amount of available storage space to a threshold amount of available storage space; and in response to the amount of available storage space exceeding the threshold amount of available storage space, determining to query the remote server for the first version of the machine learning model.

27. The method of any one of the preceding embodiments, wherein receiving the first action comprises: receiving a notification from the remote server that a new version of the machine learning model is available; and determining to query the remote server for the first version of the machine learning model based on receiving the notification.

28. The method of any one of the preceding embodiments, wherein receiving the first action comprises: receiving a notification from the remote server that a current version of the machine learning model is inaccurate; and determining to query the remote server for the first version of the machine learning model based on receiving the notification.

29. The method of any one of the preceding embodiments, wherein receiving the first action comprises: detecting the first dataset on the mobile device; and determining to query the remote server for the first version of the machine learning model based on detecting the first dataset on the mobile device.

30. The method of any one of the preceding embodiments, further comprising: continuously receiving, at the remote server, training data indicating previously classified data instances; and continuously training, at the remote server, current versions of the machine learning model based on the training data.

31. The method of any one of the preceding embodiments, wherein sanitizing the first data instance using the first version of the machine learning model further comprises: generating a first feature input based on the first data instance; inputting the first feature input into the first version of the machine learning model; receiving a first output from the first version of the machine learning model, wherein the first output comprises a first classification of the first data instance; and selecting a first sanitization operation from a plurality of sanitization operations for performing on the first data instance based on the first classification.

32. The method of any one of the preceding embodiments, the method comprising: detecting, using a data sanitization application that is locally implemented on a mobile device, a first data instance in a first dataset, wherein the first dataset is stored on the mobile device; generating, using the data sanitization application, a first feature input based on the first data instance; inputting the first feature input into a machine learning model, wherein the machine learning model is trained to classify data instances in locally-stored datasets in order to sanitize the locally-stored datasets; receiving a first output from the machine learning model, wherein the first output comprises a first classification of the first data instance and a first confidence metric for the first classification; sanitizing the first data instance using the machine learning model to generate a first sanitized data instance; and transmitting the first sanitized data instance, the first classification, and the first confidence metric to a remote server, wherein the remote server uses the first classification and the first confidence metric to measure an accuracy of the machine learning model.

33. The method of any one of the preceding embodiments, wherein sanitizing the first data instance using the machine learning model to generate the first sanitized data instance further comprises: selecting a first sanitization operation from a plurality of sanitization operations for performing on the first data instance based on the first classification; and generating the first sanitized data instance based on the first sanitization operation.

34. The method of any one of the preceding embodiments, wherein the generating the first sanitized data instance based on the first sanitization operation comprises:

generating a vector array corresponding to the first data instance; and inserting random values into the vector array to generate the first sanitized data instance.

35. The method of any one of the preceding embodiments, wherein the generating the first sanitized data instance based on the first sanitization operation comprises: generating a vector array corresponding to the first data instance; retrieving a first data masking function from a plurality of data masking functions; and applying the first data masking function to the vector array to generate the first sanitized data instance.

36. The method of any one of the preceding embodiments, further comprising: determining a data field type of the first data instance; and selecting the first data masking function from the plurality of data masking functions based on the data field type.

37. The method of any one of the preceding embodiments, wherein the machine learning model is further trained to generate confidence metrics by: determining a number of correctly classified positive data instances; determining a total number of classified positive data instances; and determining a ratio of the number of correctly classified positive data instances to the total number of classified positive data instances.

38. The method of any one of the preceding embodiments, wherein the machine learning model is further trained to generate confidence metrics by: determining a number of positive data instances correctly classified as positive; determining a total number of positive data instances; and determining a ratio of the number of positive data instances correctly classified as positive to the total number of positive data instances.

39. The method of any one of the preceding embodiments, wherein the machine learning model is further trained to generate confidence metrics by: determining a precision metric for the machine learning model; determining a recall metric for the machine learning model; and determining a harmonic mean of the precision metric and the recall metric.

40. The method of any one of the preceding embodiments, further comprising: continuously receiving, at the remote server, training data indicating previously classified data instances; and continuously training, at the remote server, current versions of the machine learning model based on the training data.

41. The method of any one of the preceding embodiments, further comprising: receiving a notification from the remote server that a current version of the machine learning model is inaccurate based on the accuracy; and determining to query the remote server for a new version of the machine learning model based on receiving the notification.

42. The method of any one of the preceding embodiments, wherein the first output further comprises a second confidence metric for the first classification, wherein the second confidence metric is transmitted with the first sanitized data instance, the first classification, and the first confidence metric to the remote server, and wherein the remote server uses the second confidence metric to measure an accuracy of the machine learning model.

43. The method of any one of the preceding embodiments, further comprising: launching a first application on the mobile device; in response to launching the first application, transmitting a request to the remote server for the machine learning model; and receiving, at the mobile device, the machine learning model.

44. The method of any one of the preceding embodiments, further comprising: running a start-up routine for the data sanitization application; determining, based on the start-up routine, that a current version of the machine learning model is outdated; and determining to query the remote server for a new version of the machine learning model based on the current version of the machine learning model being outdated.

45. A tangible, non-transitory, machine-readable medium storing instructions that, when executed by a data processing apparatus, cause the data processing apparatus to perform operations comprising those of any of embodiments 1-44.

46. A system comprising one or more processors; and memory storing instructions that, when executed by the processors, cause the processors to effectuate operations comprising those of any of embodiments 1-44.

47. A system comprising means for performing any of embodiments 1-44.

What is claimed is:

1. A non-transitory, computer-readable medium comprising instructions that when executed by one or more processors cause operations comprising:

running, at a mobile device, a start-up routine for a data sanitization application;

determining, based on the start-up routine, to query a remote server for a first version of a machine learning model, wherein the machine learning model is trained to classify data instances in locally-stored datasets in order to sanitize the locally-stored datasets;

detecting, using a data sanitization application that is locally implemented on the mobile device, a first data instance in a first dataset, wherein the first dataset is stored on the mobile device;

downloading the first version of the machine learning model to the mobile device;

sanitizing the first data instance using the first version of the machine learning model;

running the start-up routine for the data sanitization application;

determining, based on the start-up routine, that the first version of the machine learning model is outdated; and determining to query the remote server for a second version of the machine learning model based on the first version of the machine learning model being outdated;

replacing the first version of the machine learning model with the second version of the machine learning model, wherein replacing the first version of the machine learning model with the second version of the machine learning model includes downloading the second version of the machine learning model to the mobile device;

detecting, using the data sanitization application, a second data instance in the first dataset; and sanitizing the second data instance using the second version of the machine learning model.

2. The non-transitory, computer-readable medium of claim 1, wherein receiving the first action comprises:

receiving a user input to transmit the first data instance; and determining to query the remote server for the first version of the machine learning model based on receiving the user input.

3. The non-transitory, computer-readable medium of claim 1, wherein receiving the first action comprises:

receiving a user input to store the first data instance on the mobile device; and determining to query the remote server for the first version of the machine learning model based on receiving the user input.

4. The non-transitory, computer-readable medium of claim 1, wherein receiving the first action comprises:

receiving a user input launching the data sanitization application; and determining to query the remote server for the first version of the machine learning model based on receiving the user input.

5. The non-transitory, computer-readable medium of claim 1, wherein receiving the first action comprises:

detecting, using the data sanitization application, a launching of a first application; and determining to query the remote server for the first version of the machine learning model based on the launching of the first application.

6. The non-transitory, computer-readable medium of claim 1, wherein sanitizing the first data instance further comprises:

selecting a first sanitization operation from a plurality of sanitization operations for performing on the first data instance based on a first classification; and generating a first sanitized data instance based on the first sanitization operation.

7. The non-transitory, computer-readable medium of claim 6, wherein generating the first sanitized data instance based on the first sanitization operation comprises:

generating a vector array corresponding to the first data instance; and inserting random values into the vector array to generate the first sanitized data instance.

8. The non-transitory, computer-readable medium of claim 6, wherein generating the first sanitized data instance based on the first sanitization operation comprises:

generating a vector array corresponding to the first data instance;

retrieving a first data masking function from a plurality of data masking functions; and applying the first data masking function to the vector array to generate the first sanitized data instance.

9. The non-transitory, computer-readable medium of claim 8, further comprising:

determining a data field type of the first data instance; and selecting the first data masking function from the plurality of data masking functions based on the data field type.

10. The non-transitory, computer-readable medium of claim 1, wherein the machine learning model is further trained to generate confidence metrics by:

determining a number of correctly classified positive data instances;

determining a total number of classified positive data instances; and determining a ratio of the number of correctly classified positive data instances to the total number of classified positive data instances.

11. The non-transitory, computer-readable medium of claim 1, wherein the machine learning model is further trained to generate confidence metrics by:

determining a number of positive data instances correctly classified as positive;

determining a total number of positive data instances; and determining a ratio of the number of positive data instances correctly classified as positive to the total number of positive data instances.

12. The non-transitory, computer-readable medium of claim 1, wherein the machine learning model is further trained to generate confidence metrics by:

determining a precision metric for the machine learning model;

determining a recall metric for the machine learning model; and determining a harmonic mean of the precision metric and the recall metric.

13. The non-transitory, computer-readable medium of claim 1, wherein the machine learning model is trained by:

continuously receiving, at the remote server, training data indicating previously classified data instances; and continuously training, at the remote server, current versions of the machine learning model based on the training data.

14. The non-transitory, computer-readable medium of claim 1, wherein querying the remote server for the second version of the machine learning model further comprises receiving a notification that a current version of the machine learning model is inaccurate.

15. The non-transitory, computer-readable medium of claim 1, wherein the machine learning model generates a first output comprising a second confidence metric for a first classification, wherein the second confidence metric is transmitted with a first sanitized data instance, a first classification, and a first confidence metric to the remote server, and wherein the remote server uses the second confidence metric to measure an accuracy of the machine learning model.

16. A method, the method comprising:

running, at a mobile device, a start-up routine for a data sanitization application;

determining, based on the start-up routine, to query a remote server for a first version of a machine learning model, wherein the machine learning model is trained to classify data instances in locally-stored datasets in order to sanitize the locally-stored datasets;

detecting, using a data sanitization application that is locally implemented on the mobile device, a first data instance in a first dataset, wherein the first dataset is stored on the mobile device;

downloading the first version of the machine learning model to the mobile device;

sanitizing the first data instance using the first version of the machine learning model;

running the start-up routine for the data sanitization application;

determining, based on the start-up routine, that the first version of the machine learning model is outdated; and determining to query the remote server for a second version of the machine learning model based on the first version of the machine learning model being outdated;

replacing the first version of the machine learning model with the second version of the machine learning model, wherein replacing the first version of the machine learning model with the second version of the machine learning model includes downloading the second version of the machine learning model to the mobile device;

detecting, using the data sanitization application, a second data instance in the first dataset; and sanitizing the second data instance using the second version of the machine learning model.

17. The method of claim 16, wherein receiving the first action comprises:

receiving a user input to transmit the first data instance; and determining to query the remote server for the first version of the machine learning model based on receiving the user input.

18. The method of claim 16, wherein receiving the first action comprises:

receiving a user input to store the first data instance on the mobile device; and determining to query the remote server for the first version of the machine learning model based on receiving the user input.

19. The method of claim 16, wherein receiving the first action comprises:

receiving a user input launching the data sanitization application; and determining to query the remote server for the first version of the machine learning model based on receiving the user input.

20. The method of claim 16, wherein the start-up routine comprises a regex routine.

21. The method of claim 16, wherein running the start-up routine further comprises:

determining a classification type; and selecting a routing specific to the classification type.

* * * * *